United States Patent [19]

Tano et al.

[11] 4,182,556
[45] Jan. 8, 1980

[54] CAMERA INDICATION DEVICE

[75] Inventors: Eiichi Tano, Kamifukuoka; Shinji Urata, Tachikawa, both of Japan

[73] Assignee: Asahi Kogaku Kogyo Kabushiki Kaisha, Tokyo, Japan

[21] Appl. No.: 955,743

[22] Filed: Oct. 30, 1978

[30] Foreign Application Priority Data

Oct. 28, 1977 [JP] Japan .............................. 52-144649[U]

[51] Int. Cl.² ............................................ G03B 17/18
[52] U.S. Cl. ................................................. 354/60 L
[58] Field of Search ...................... 354/53, 60 E, 60 L, 354/289

[56] References Cited

U.S. PATENT DOCUMENTS

| 4,089,015 | 5/1978 | Uno et al. | 354/60 E X |
| 4,141,633 | 2/1979 | Uno et al. | 354/60 E X |

Primary Examiner—Michael L. Gellner
Attorney, Agent, or Firm—Sughrue, Rothwell, Mion, Zinn and Macpeak

[57] ABSTRACT

An indication device in a single lens camera of through-the-lens automatic exposure control type. The device comprises an aperture control device for controlling an aperture value by utilizing an object brightness (B), a film sensitivity (S) and a manual shutter speed (T). Also, a shutter control device is employed in which stopped-down metering is carried out by using an aperture value (A) controlled by the aperture control device. An actual aperture value controlled by the aperture value (A) and a shutter speed are automatically set according to the object brightness and film sensitivity to have a suitable exposure value according to the following equation:

$$A_V = S_V + B_V - T_V$$

where: $A_V$ is the APEX indication value of the aperture value, $S_V$ is the film sensitivity, $B_V$ is the object brightness, and $T_V$ is the manual shutter speed. When the aperture value controlled is at the full-aperture value $(A_O)$ of a photographing lens, light metering is effectuated with the full-aperture value $(A_O)$. When the resulting shutter speed (T) controlled by the shutter control device according to the object brightness and film sensitivity is at a camera shake limit speed $(T_O)$, a camera shake limit indication is carried out under the following condition:

$$S_V + B_V < A_{OV} + T_{OV}$$

where $A_{OV}$ is the full-aperture value, and $T_{OV}$ is the camera shake limit speed.

6 Claims, 3 Drawing Figures

CAMERA INDICATION DEVICE

BACKGROUND OF THE INVENTION

This invention relates to an indication device in a camera having shutter priority type aperture control (hereinafter referred to merely as "EE") mechanism. In such systems shutter speed is predetermined and aperture values to obtain a proper exposure are determined based on film ASA, brightness of the object and the predetermined shutter speed.

In a camera exposure control circuit, calculation of the APEX indication values $B_V$, $S_V$, $A_V$ and $T_V$ of object brightness (B), film sensitivity (S), aperture value (A) and exposure time (T) are carried out in accordance with an expression $(B_V+S_V=A_V+T_V)$. In the aforementioned EE device, the aperture value is controlled according to an equation $(A_V=B_V+S_V-T_V)$. However, it is impossible to control the aperture value for the condition $A_{OV} > A_V$ where $A_{OV}$ is the APEX indication value of the full diameter $A_O$ of the lens. Hence this condition, heretofore has been independently signalled to the operator as one where the lens cannot be opened wide enough to take a correct exposure for the conditions measured and/or known.

A system has been proposed by Japanese Utility Model Application Laid-Open No. 84437/1976, in which in the case of $A_{OV} < A_V$, the shutter speed is controlled, and the APEX indication value $T'_V$ of the shutter speed thus controlled is determined according to the following equation:

$$T_V = B_V + S_V - A_{OV}.$$

Referring now to FIG. 1, one example of the control mode according to this concept will be described.

The specific feature of this type of system resides in the exposure time being automatically varied even out of the aperture value control range. Therefore, a suitable exposure value can be obtained at all times. However, in the indication method according to such a technique, an aperture value to be controlled is indicated in the EE control. Therefore, in such a condition it is impossible to know the shutter speed which is automatically controlled outside the EE control range (hereinafter referred to merely as "ES"). Accordingly, even if the shutter speed reaches a value that is very slow, for example lower than the camera shake limit speed in the ES control, the photographer will not be aware of this condition. The result will be a failure in photographing caused by the shake of camera while the shutter is held open for the control time period.

SUMMARY OF THE INVENTION

Accordingly, an object of this invention is to provide an indication device in which aperture value control is indicated.

It is another object of this invention to have aperture value control detected by a simple arrangement such that when the shutter speed becomes lower than the camera shake limit speed in the ES control, an indication member such as a light emitting diode will indicate and notify the occurrence of camera shake to the photographer in advance of initiation of the exposure sequence.

It is another object of this invention to eliminate a failure in photographing due to the camera shake.

These and other objects of this invention are accomplished by a camera indication system in an SLR camera employing through the lens (TTL) automatic exposure control. The device comprises an aperture control device for controlling an aperture value by utilizing an object brightness (B), a film sensitivity (S) and a manual shutter speed (T). Also, a shutter control device is employed in which stopped-down metering is carried out by using an aperture value (A) controlled by the aperture control device. An actual aperture value controlled by said aperture value (A) and a shutter speed are automatically set according to the object brightness (B) and film sensitivity (S) to have a suitable exposure value, so that the aperture value (A) is indicated according to the following equation:

$$A_V = S_V + B_V - T_V$$

where; $A_V$ is the APEX indication value of the aperture value (A), $S_V$ is the APEX indication value of the film sensitivity (S), $B_V$ is the APEX indication value of the object brightness (B), and $T_V$ is the APEX indication value of the manual shutter speed (T). When the aperture value controlled is at the full-aperture value ($A_O$) of a photographing lens, light metering is effectuated with the full-aperture value ($A_O$). When the resulting shutter speed (T) controlled by the shutter control device according to the object brightness (B) and film sensitivity (S) is at a camera shake limit speed ($T_O$), a camera shake limit indication is carried out under the following condition:

$$S_V + B_V < A_{OV} + T_{OV}$$

where $A_{OV}$ is the APEX indication value of the full-aperture value ($A_O$), and $T_{OV}$ is the APEX indication value of the camera shake limit speed.

These and other objects of this invention will become more apparent from the drawings and the description of the preferred embodiment that follows.

DETAILED DESCRIPTION OF THE PREFERRED EMBODIMENT

Figure 1:
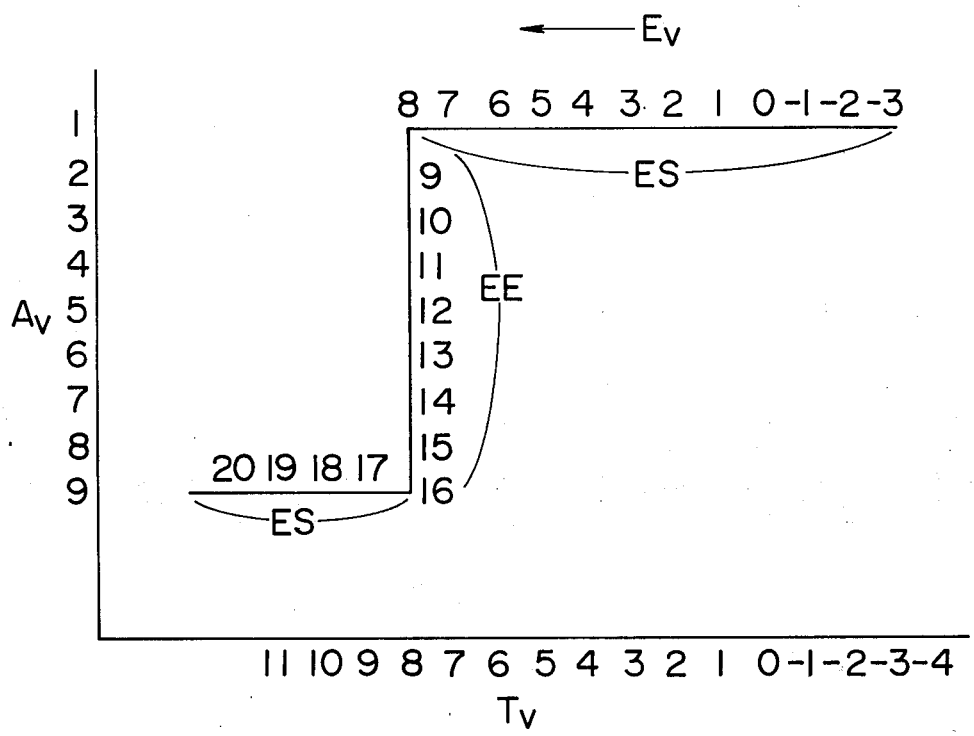
FIG. 1 is a diagram showing one example of a camera control mode for a description of the principle of this invention.
Figure 2:
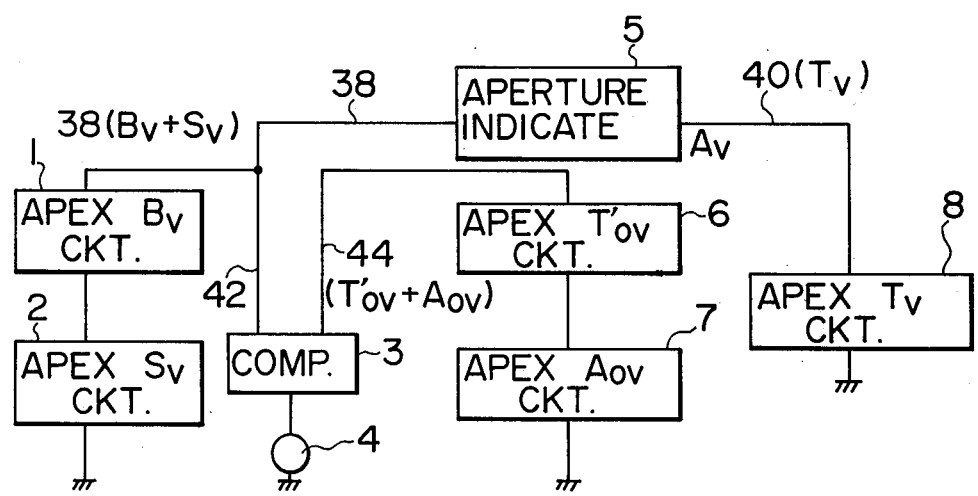
FIG. 2 is a block diagram showing a camera shake warning indication device according to this invention.

The principle of this will now be described with reference to FIG. 2. A circuit block 1 for generating the APEX indication value $B_V$ of an object brightness (B) is coupled to circuit block 2 for generating the APEX indication value $S_V$ of a film sensitivity (S). A comparator 3 receives an output from circuit 1 and delivers a signal to a camera shake warning indication member 4. An indication member 5 is provided for indicating the APEX indication value AV of an aperture value (A). A circuit block 6 is employed for generating the APEX indication value $T'_{OV}$ of the camera shake limit speed $T'_O$ of a shutter speed T controlled in the above-described ES control. Generation of the APEX indication value $A_{OV}$ of the full-aperture value $A_O$ is accomplished in block 7 and circuit block 8 is used for generating the APEX indication value $T_V$ of a manual speed.

In operation, the indication member 5 indicates the value $A_V = S_V + B_V - T_V$. The value $(S_V + B_V)$ is generated by the $B_V$ generating block 1 and the $S_V$ generating block 2 along line 38 and the value $T_v$ is generated by the $T_V$ generating block 8 on line 40. These values are combined in circuit block 5. Also, the value $(S_V + B_V)$ on line 42 and a value $(T'_{OV} + A_{OV})$ generated by the $T'_{OV}$ generating block 6 and the $A_{OV}$ generating block 7 on line 44 are used as inputs in the comparator 3. When the following expression is established with respect to variations of the value $(S_V + B_V)$, a camera shake warning is generated by the indication member 4.

$$S_V + B_V < T_{OV} + A_{OV}$$

One preferred embodiment of the circuitry to accomplish this result will now be described with reference to FIG. 3.

Figure 3:
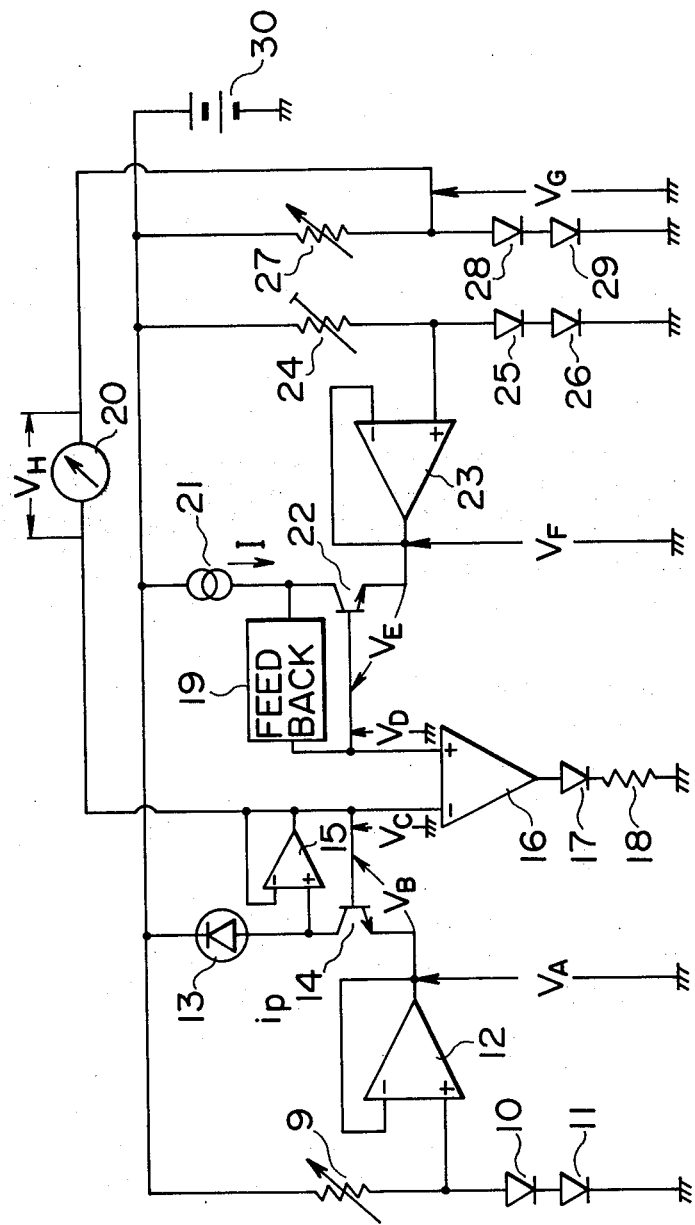
FIG. 3 is a circuit diagram showing one example of the camera shake warning indication device according to this invention.

Referring now to FIG. 3, a variable resistor 9 is set according to a film sensitivity S, and together with diodes 10 and 11 connected in series is coupled to a D.C. source 30. The connection point of the variable resistor 9 and the diode 10 is connected to an operational amplifier 12 which is arranged as a voltage follower circuit.

A semi-fixed resistor 24 can be set according to a camera shake limit speed, and is connected in series with diodes 25 and 26 the source 30. The connection point of the variable resistor 24 and the diode 25 is connected to an operational amplifier 23 which is arranged as a voltage follower circuit.

The collector of a transistor 14 is connected to an opto-electro-motive force sensor 13. The emitter of transistor 14 is coupled to the output of the operational amplifier 12. Feedback is effectuated from the collector of the transistor 14 to the base thereof through a high input resistance operational amplifier 15 which is arranged as a voltage follower circuit.

A variable resistor 27 is set according to a manual shutter speed and is connected in series to diodes 28 and 29. These are in turn connected in series to the source 30. The connection point between the variable resistor 27 and the diode 28 is connected to the base of the transistor 14 through a voltmeter 20 for indicating an aperture value.

The emitter of a transistor 22 is connected to the output of the operational amplifier 23 and the collector is connected through a constant current source 21 and in turn to the source 30. Feed-back is accomplished from the collector of the transistor 22 to the base thereof through a feed-back circuit 19. The inversion input terminal and the non-inversion input terminal of a comparator 16 are connected to the base of the transistor 22 and the base of the transistor 14, respectively. The output terminal of the comparator 16 is connected to a series circuit comprising a light emitting diode 17 and a fixed resistor 18.

The operation of the circuit shown in FIG. 3 will now be described. The optical current $i_p$ of the opto-electromotive force sensor 13 is applied to the collector of the transistor 14. Since, the feed-back is effectuated from the collector of the transistor 14 to its base through the high input resistance operational amplifier 15 as described above, the base-emitter voltage $V_B$ of the transistor 14 becomes a compressed voltage corresponding to the optical current $i_p$. That is, it is a voltage that is generated corresponding to the APEX indication value $B_V$ of an object brightness B.

The terminal voltage of the diodes 10 and 11 becomes a voltage corresponding to the current which is determined by the variable resistor 9 which is set according to a film sensitivity as described before. That is, the terminal voltage of the diodes 10 and 11 becomes equal to the output voltage $V_A$ of the operational amplifier 12. Hence, the output voltage $V_A$ corresponds to the APEX indication value $S_V$ of the film sensitivity (S).

Similarly, the terminal voltage $V_G$ of the diodes 28 and 29 becomes a voltage corresponding to the APEX indication value $T_V$ of the manual shutter speed T. Therefore, if current flowing through the voltmeter 20 is sufficiently smaller than current flowing through the diodes 28 and 29, then a potential difference $V_H$ across the voltmeter 20 can be expressed by the following equation (1):

$$V_H = V_B + V_A - V_G \tag{1}$$

In equation (1), the voltages $V_B$, $V_A$ and $V_G$ correspond to the APEX indication values $B_V$, $S_V$ and $T_V$ of the object brightness (B), film sensitivity (S) and manual shutter speed T, respectively. Therefore, the voltage $V_H$ becomes a voltage corresponding to $(B_V + S_V - T_V)$ that is, a voltage corresponding to the APEX indication value $A_V$ of the aperture value (A). The aperture value (A) is related to its APEX value as indicated by the following equation (2):

$$A = 2^{A_V/2} \tag{2}$$

Therefore, the voltmeter 20 is designed that its indication voltage $V_M$ corresponds to the aforementioned potential difference $V_H$ as indicated by the following equation (3):

$$V_M \propto 2^{V_H/2} \tag{3}$$

If this relationship is satisfied, the indication voltage $V_M$ of the voltmeter 20 is proportional to the aperture value (A). That is, the aperture value (A) can be indicated by the voltmeter 20.

In similar manner as with the above-described case, the output voltage $V_F$ of the operational amplifier 23 becomes a voltage corresponding to the APEX indication value $T'_{OV}$ of the camera shake limit speed $T'_O$. As in the case of the above-described value $V_B$, the base-emitter voltage $V_E$ of the transistor 22 becomes a compressed voltage corresponding to a constant current I supplied from the constant current source 21. If the current I is set to a current value $T'_O$ corresponding to the APEX indication value $A_{OV}$ of the full-aperture value $A_O$, the voltage $V_E$ corresponds to the value $A_{OV}$. Therefore, the base voltage $V_D$ of the transistor 22 can be expressed by the following equation (4):

$$V_D = V_E + V_F \tag{4}$$

In equation (4), the values $V_E$ and $V_F$ correspond to the APEX indication values $A_{OV}$ and $T'_{OV}$ of the full-aperture value $A_O$ and the camera shake limit shutter speed $T'_O$. Therefore, the voltage $V_D$ corresponds to $(A_{OV} + T'_{OV})$.

The comparator 16 operates to compare the base voltage $V_C$ of the transistor 14 with the base voltage $V_D$ of the transistor 22. The output of the comparator 16 is at a logical high level when $V_C < V_D$ and at a logical low level when $V_C > V_D$. However, since the voltage $V_D$ is expressed by equation (4) the voltage $V_C$ is expressed by the following equation (5):

$$V_C = V_A + V_V \quad (5)$$

the output voltage of the comparator 16 is at the high level when $S_V + B_V < A_{OV} + T'_{OV}$, and at the low level when $S_V + B_V > A_{OV} + T'_{OV}$.

When the output voltage of the comparator 16 is at the high level, the comparator 16 drives the light emitting diode 17 to provide the camera shake warning indication. That is, when the aforementioned expression $S_V + B_V < A_{OV} + T'_{OV}$ is established, the camera shake warning is indicated to the operator.

As is apparent from the above description, according to this invention, the aperture value controlled in the EE control is indicated, when the shutter speed in the ES control reaches the camera shake limit speed, a camera shake warning is displayed by the indication member such as a light emitting diode. Accordingly, the photographer can satisfactorily carry out photographing merely by paying attention to the mode of camera mounting, i.e., Band held or tripod, to only if the shutter speed controlled in the ES control is lower than the camera shake limit speed. It is apparent that modifications of this invention are possible without departing from the essential scope of the invention.

What is claimed is:

1. An indication device in a single lens camera of through-the-lens automatic exposure control type comprising;

an aperture control circuit for controlling an aperture utilizing inputs of measured object brightness (B), predetermined film sensitivity (S) and a manual shutter speed (T);

a shutter-control circuit means for effectuating stopped-down metering using an aperture value (A) generated by said aperture control device; wherein an actual aperture value controlled by said aperture value (A) and an actual shutter speed are automatically set according to the object brightness (B) and film sensitivity (S) to have a suitable exposure value, and the aperture value (A) is determined according to the following equation:

$$A_V = S_V + B_V - T_V$$

where $A_V$ is the APEX indication value of the aperture value (A);

$S_V$ is the APEX indication value of the film sensitivity;

$B_V$ is the APEX indication value of the object brightness (B); and $T_V$ is the APEX indication value of the manual shutter speed (T);

a camera shake limit indication device; whereby said aperture value generated is the full-aperture value ($A_O$) of a photographing lens, light metering is effectuated with the full-aperture value ($A_O$) and, comparator means such that when the shutter speed (T) controlled by the shutter control device according to the object brightness (B) and film sensitivity (S) is at a camera shake limit speed ($T_O$), a camera shake limit indication is effectuated under the following condition:

$$S_V + B_V < A_{OV} + T_{OV}$$

where $A_{OV}$ is the APEX indication value of the full-aperture value ($A_O$), and $T_{OV}$ is the APEX indication value of the camera shake limit speed.

2. The indication device according to claim 1, wherein said aperture control circuit comprises sensor means for measuring the brightness of an object to be photographed, a variable resistor adjustable to be set in accordance with film sensitivity and an operational amplifier.

3. The indication device according to claim 2, wherein said aperture control circuit further comprises a transistor coupled to the outputs of said operational amplifier and said sensor means.

4. The indication device of claim 3 further comprising resistor means settable to the APEX indication value $T_{OV}$ and differential amplifier means responsive to the voltage across said resistor means and the emitter voltage of said transistor.

5. The indication device of claims 1 or 3 further comprising a second variable resistor settable to a manual shutter speed.

6. The indication device of claim 5, wherein aperture value A is effectuated by a voltmeter measuring the difference in outputs between said aperture control circuit and across said second variable resistor.

* * * * *